US011999038B2

(12) United States Patent
Blair et al.

(10) Patent No.: US 11,999,038 B2
(45) Date of Patent: Jun. 4, 2024

(54) ATTACHMENT FOR POWERED HAMMER

(71) Applicant: MILWAUKEE ELECTRIC TOOL CORPORATION, Brookfield, WI (US)

(72) Inventors: Ian H. A. Blair, Wauwatosa, WI (US); Peter R. Heath, Wauwatosa, WI (US); James E. Pangerc, Pewaukee, WI (US); Joseph D. Greaney, Milwaukee, WI (US); Julian L. Kinneavy, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/132,182

(22) Filed: Apr. 7, 2023

(65) Prior Publication Data

US 2023/0321807 A1 Oct. 12, 2023

Related U.S. Application Data

(60) Provisional application No. 63/328,849, filed on Apr. 8, 2022.

(51) Int. Cl.
*B25D 17/00* (2006.01)

(52) U.S. Cl.
CPC ...... *B25D 17/005* (2013.01); *B25D 2250/051* (2013.01); *B25D 2250/331* (2013.01); *B25D 2250/371* (2013.01)

(58) Field of Classification Search
CPC ............ B25D 17/005; B25D 2250/051; B25D 2250/331; B25D 2250/371
See application file for complete search history.

(56) References Cited

U.S. PATENT DOCUMENTS 3,454,113 A * 7/1969 Holtz .................... E04H 17/263 173/129
4,776,407 A * 10/1988 Kostylev .................. E02D 7/20 173/55
5,010,710 A * 4/1991 Gray ..................... E04H 17/263 173/90
5,029,427 A * 7/1991 Jewett .................. E04H 17/263 52/741.11

(Continued)

OTHER PUBLICATIONS

Hilti; "Rod Setting Tool TE-S PD 22 Operating Instruction"; Oct. 31, 2018 (Year: 2018).*

(Continued)

*Primary Examiner* — Thanh K Truong
*Assistant Examiner* — David G Shutty
(74) *Attorney, Agent, or Firm* — Michael Best & Friedrich LLP

(57) ABSTRACT

An attachment configured for use with a powered hammer to drive a rod into the ground includes a body, an impact portion, and a driving portion in which the rod is receivable. The impact portion defines an impact axis and includes a bore configured to receive a driving shank coupled to the powered hammer. The impact portion is configured to receive repeated impacts from the powered hammer. The driving portion includes a side load driving portion defining a side load driving axis that is parallel to the impact axis. The driving portion further includes a top load driving portion defining a top load driving axis that is parallel to the side load driving axis.

15 Claims, 8 Drawing Sheets

(56) References Cited

U.S. PATENT DOCUMENTS

| | | | | |
|---|---|---|---|---|
| 11,084,156 | B1 * | 8/2021 | Jordan | E04H 12/347 |
| 11,214,977 | B2 * | 1/2022 | Martin | E04H 17/265 |
| 2019/0262982 | A1 * | 8/2019 | Ebner | B25D 17/005 |

OTHER PUBLICATIONS

Ebay; "Hilti TE-S PD 22 Rebar Hammer Tool"; website: https://www.ebay.com/itm/115695754165 (Year: 2023).*

Hilti, "TE-S PD, TE-Y PD," Operating Instructions, 2018 (1 page).

Hilti, "Rod Setting Tool TE-Y PD 20," <https://www.hilti.com/c/CLS_POWER_TOOLS_7124/CLS_DEMOLITION_HAMMER_BREAKER_SUB_7124/CLS_ACC_DEMOLITION_HAMMERS_BREAKERS_7124/2223701> web page visited Apr. 10, 2023 (4 pages).

Driveze Corp., "Power Type Ground Rod Driver," <http://www.drivezecorp.com/powgroundrod.html> web page visited Apr. 10, 2023 (2 pages).

* cited by examiner

ATTACHMENT FOR POWERED HAMMER

CROSS REFERENCE TO RELATED APPLICATIONS

The present application claims priority to U.S. Provisional Patent Application No. 63/328,849, filed Apr. 8, 2022, the entire contents of which is hereby incorporated by reference.

FIELD OF THE INVENTION

The present invention relates to powered hammers, and more particularly to attachments for use with powered hammers.

BACKGROUND OF THE INVENTION

Long metal ground rods are inserted into the ground to electrically ground various circuits. For example, a ground rod may be used near transmission line towers to electrically ground the transmission lines or near residential construction to electrically ground a residential circuit. To install, the rods are typically positioned vertically on the ground, and an operator subsequently applies downward impacts upon a top end of the rod to drive it into the ground.

SUMMARY OF THE INVENTION

The present invention provides, in one aspect, an attachment configured for use with a powered hammer to drive a rod into the ground. The attachment includes a body, an impact portion, and a driving portion in which the rod is receivable. The impact portion defines an impact axis and includes a bore configured to receive a driving shank coupled to the powered hammer. The impact portion is configured to receive repeated impacts from the powered hammer. The driving portion includes a side load driving portion defining a side load driving axis that is parallel to the impact axis. The driving portion further includes a top load driving portion defining a top load driving axis that is parallel to the side load driving axis.

The present invention provides, in another aspect, an attachment configured for use with a powered hammer to drive a rod into the ground. The attachment includes a body, an impact portion defining an impact axis, and a side load driving portion in which the rod is receivable. The impact portion includes a bore configured to receive a driving shank coupled to the powered hammer, and the impact portion is configured to receive repeated impacts from the powered hammer. The side load driving portion includes a one-way collet including a plurality of bearings configured to engage the rod and transmit a driving force due to the impacts from the powered hammer to the rod.

The present invention provides, in yet another aspect, an attachment configured for use with a powered hammer to drive a rod into the ground. The attachment includes a body having a first end and a second end opposite the first end, an impact portion positioned on the first end of the body and configured to receive repeated impacts from the powered hammer, a top load driving portion positioned on the second end of the body, and a side load driving portion. The impact portion includes a bore configured to receive a driving shank coupled to the powered hammer. The top load driving portion is configured to transmit the impacts to a top of the rod, and the side load driving portion is configured to transmit the impacts to a side of the rod. The side load driving portion includes a frustoconical collet disposed within an aperture in the body and configured to receive the rod, a biasing member configured to bias the collet towards the body, and an end plate disposed within the body and configured to secure the biasing member within the body.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
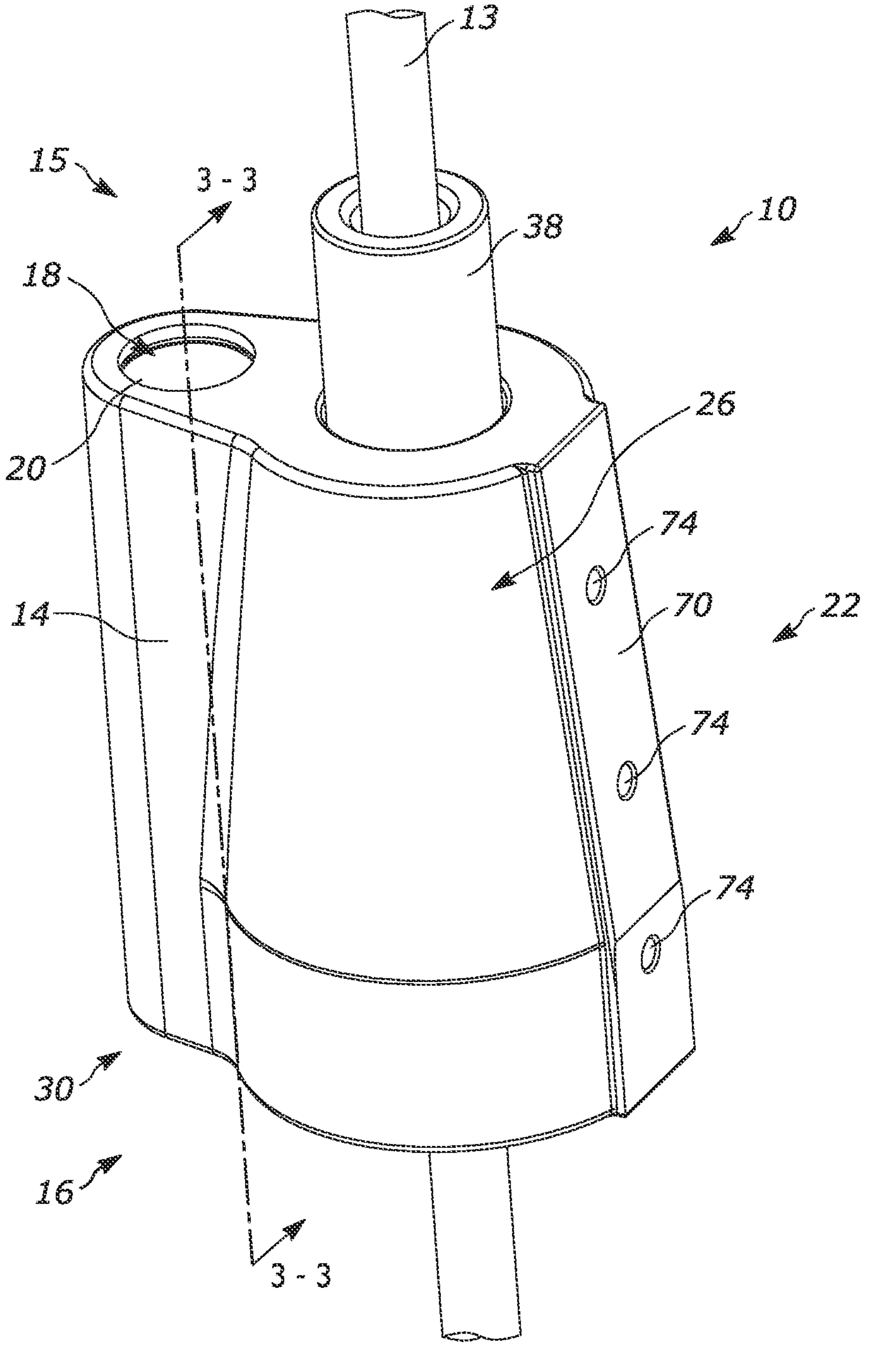
FIG. 1 is a top perspective view of an attachment for use with a powered hammer according to one embodiment of the present disclosure.
Figure 2:
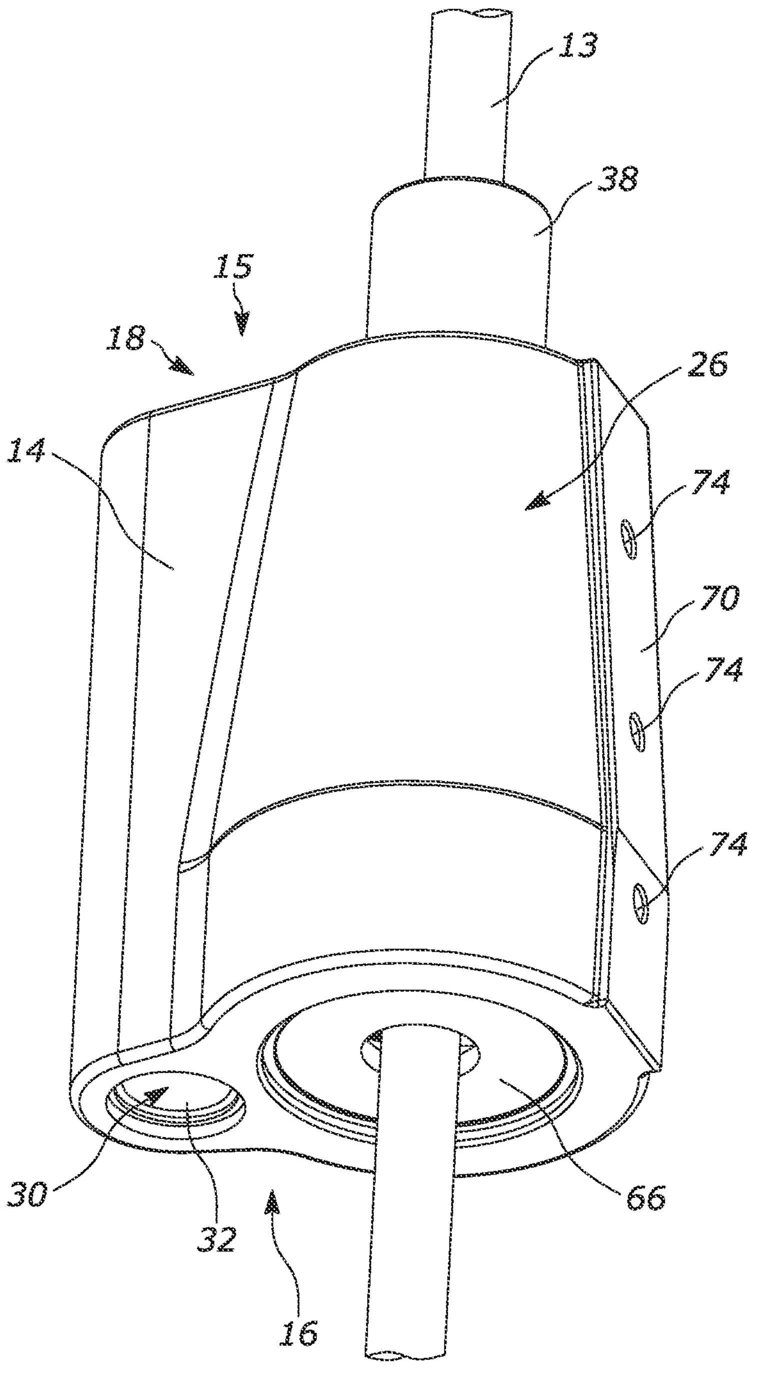
FIG. 2 is a bottom perspective view of the attachment of FIG. 1.

FIGS. 1-4 illustrate an attachment 10 configured for use with a reciprocating power tool (e.g., a powered hammer, not shown) to drive a rod 13 into the ground. The attachment 10 includes a body 14 having a first end 15 and a second end 16 opposite the first end 15. The attachment 10 further includes an impact receiving portion 18 and a driving portion 22 disposed within the body 14. The impact portion 18 is positioned on the first end 15 of the body 14 and receives impacts from the powered hammer, and the driving portion 22 transmits a driving force generated by the impacts to the rod 13 to drive the rod 13 into the ground. More particularly, the illustrated driving portion 22 includes a side load driving portion 26 and a top load driving portion 30 (FIG. 2). The side load driving portion 26 transmits the driving force to sides of the rod 13, while the top load driving portion 30 is positioned on the second end 16 of the body 14 and transmits the driving force to a top end of the rod 13. In operation, the side load driving portion 26 is used to drive the rod 13 into the ground until the rod 13 is nearly driven into the ground. When the rod 13 is nearly driven into the ground, an operator is able to switch to the top load driving portion 30 to complete driving the rod 13 into the ground. The attachment 10 of the present disclosure allows for efficient driving of the rod 13 into the ground, without the operator needing to switch attachments to complete the driving process.

Figure 3:
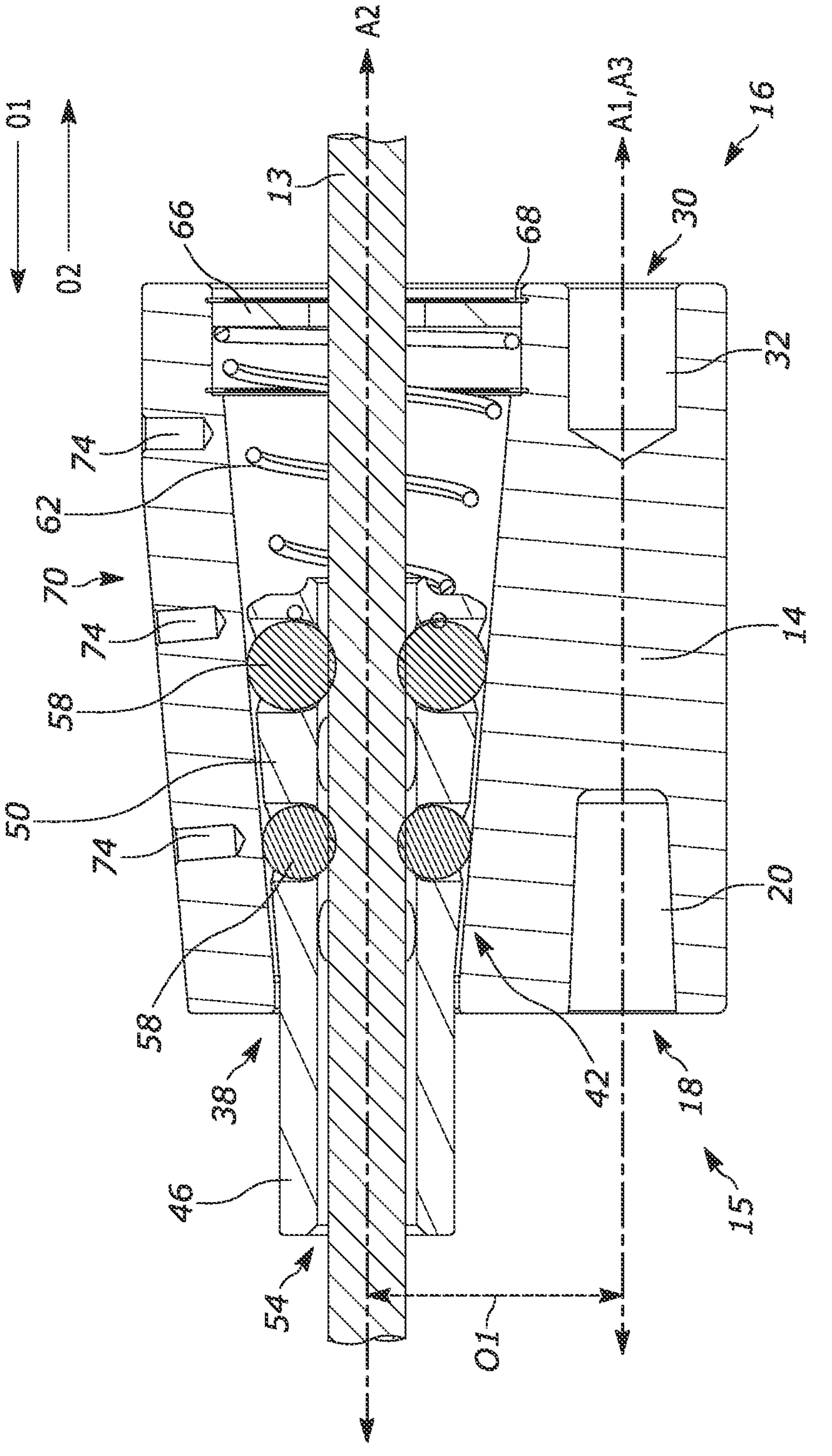
FIG. 3 is a cross-sectional view of the attachment of FIG. 1, taken along section line 3-3 in FIG. 1.

With reference to FIGS. 1 and 3, the impact portion 18 is located on a first side of the body 14. The illustrated impact portion 18 includes a bore 20. More particularly, the bore 20 is a blind bore. A longitudinal axis of the impact portion 18 defines an impact axis A1. The impact portion 18 is shaped to receive a driving shank (not shown) of a powered hammer to couple the attachment 10 to the powered hammer. An interference fit may exist between the driving shank and the impact portion 18 such that impacts from the powered hammer during operation secure the driving shank within the impact portion 18 (e.g., the blind bore 20). In other words, the driving shank is not removable from the impact portion 18 after use. The impact portion 18 may include a sizing feature, such as an insert 34 (FIG. 6), adapted to adjust a diameter of the impact portion 18 to accommodate different size shanks. In some embodiments, the driving shank is coupled to the body 14 via a quick-connect system, rather than an interference fit, so that the driving shank is replaceable. The quick connect system may be similar to a chuck of the powered hammer. In yet other embodiments, the driving shank is a post extending from the body 14 and integrally formed with the body 14. The post is shaped to be received within the chuck of the powered hammer to received repeated impacts therefrom.

With reference to FIG. 3, the side load driving portion 26 includes a one-way collet 38 for selectively securing the rod 13 relative to the body 14 of the attachment 10 and transmitting the driving force from the powered hammer into the rod 13 to drive the rod 13 into the ground. A longitudinal axis of the side load driving portion 26 defines a side load driving axis A2. The side load driving axis A2 is parallel to the impact axis A1. The side load driving axis A2 is also offset from the impact axis A1. The collet 38 allows the attachment 10 to move relative to the rod 13 in a first direction D1 along the side load driving axis A2 and prevents relative motion between the rod 13 and the attachment 10 in a second direction D2 along the driving axis A2. The second direction D2 is the driving direction (e.g., into the ground). In operation, the one-way collet 38 prevents the attachment 10 from moving along the rod 13 towards the ground, thereby facilitating the driving of the rod 13, while allowing the attachment 10 to be moved along the rod 13 away from the ground, thereby allowing the operator to re-position the attachment 10 along the rod 13 as the rod 13 is driven into the ground.

Figure 4:
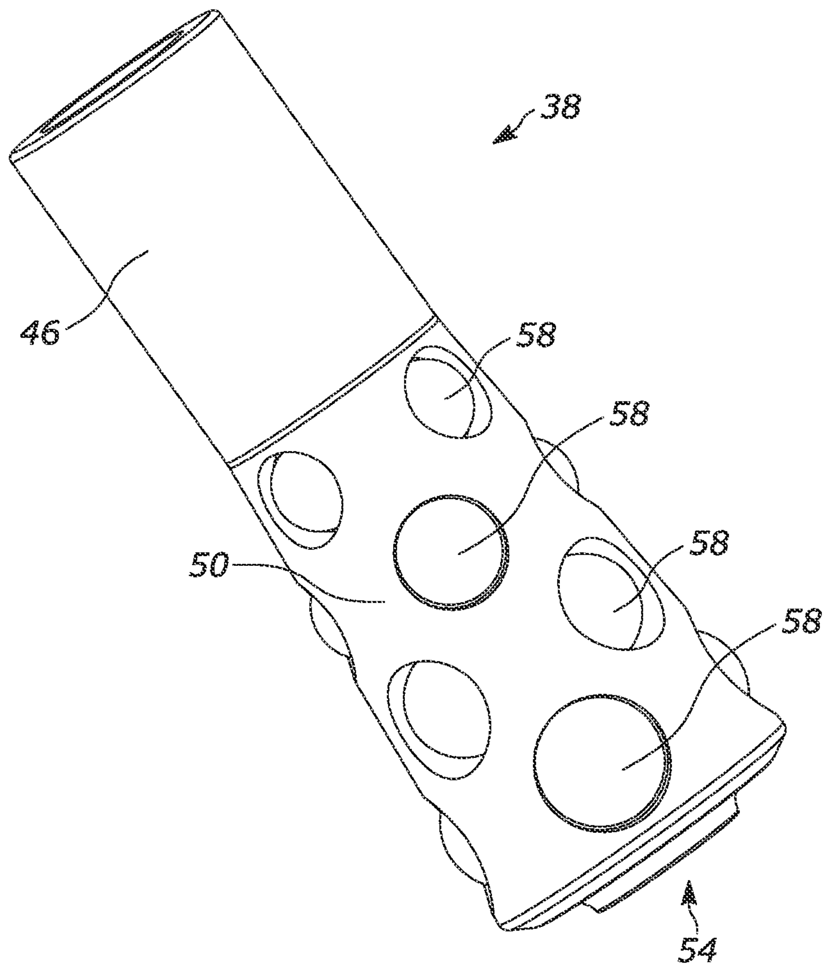
FIG. 4 is a top perspective view of a collet for use with the attachment of FIG. 1.

With continued reference to FIG. 3, the body 14 includes an aperture 42 in which the collet 38 is received. In the illustrated embodiment, the aperture 42 is a frustoconical aperture. The aperture 42 narrows towards a top of the attachment 10 (e.g., proximate the powered hammer). The illustrated collet 38 includes a cylindrical portion 46, a frustoconical portion 50, and a central bore 54 extending a length of the collet 38 and adapted to receive the rod 13 therein. The cylindrical portion 46 is located at a top of the collet 38 and extends beyond the body 14 of the attachment 10 through the narrow portion of the aperture 42. The frustoconical portion 50 is sized and shaped to fit within the frustoconical aperture 42 of the body 14. For example, the frustoconical portion 50 of the collet 38 has a similar slope to the frustoconical aperture 42 of the body 14. The slope of the illustrated embodiment is 5 degrees. In other embodiments, the slope of the collet 38 may be greater than or less than 5 degrees. Spaced circumferentially about the frustoconical portion 50 are a plurality of ball bearings 58. The ball bearings 58 partially extend radially into the central bore 54 to engage the rod 13 and transmit driving forces to the rod 13. The collet 38 of the illustrated embodiment includes four rows of differently sized ball bearings 58 (FIG. 4). Each row of bearings 58 is offset from the rows above and/or below. In the illustrated embodiment, the offset between each row is 45 degrees. Each bearing 58 within a row is of the same nominal size, while bearings 58 in adjacent rows have different nominal sizes. The difference between bearing sizes in adjacent rows corresponds to the slope of the frustoconical portion 50. In other words, as the aperture 42 widens, the bearings 58 increase in size. This allows each bearing 58 to simultaneously engage the rod 13 when the rod 13 is inserted in the collet 38. In other embodiments, the collet 38 may include more or fewer bearings 58 in each row, more or fewer rows of bearings 58, and a greater or smaller offset between rows of bearings 58, depending on the desired size of the attachment 10 and desired diameter of rods 13 to be driven by the attachment 10. However, irrespective of the number or offset, the bearings 58 are sized to correspond to the slope of the frustoconical portion 50 to properly secure the rod 13. Each bearing 58 equally engages the rod 13 to reduce marring during the driving operation. Marring can decrease the grounding capabilities of the rod 13 after it is driven, and therefore should be avoided.

The side load driving portion 26 further includes a biasing member 62 to bias the collet 38 against the aperture 42 and an end cap 66 to secure the collet 38 within the aperture 42. In other words, the biasing member 62 is configured to bias the collet 38 towards the first end 15 of the body 14. The end cap 66 is located below the collet 38, and the biasing member 62 is disposed between the end cap 66 and the collet 38. In one embodiment, the biasing member 62 is a conical compression spring, and the end cap 66 is a washer secured within the aperture 42 by a snap ring 68 (FIG. 3). In another embodiment, the biasing member 62 is a cylindrical compression spring, and the end cap 66 is a cup extending from a bottom of the aperture 42 (FIG. 7) and secured to the aperture 42 via a threaded connection.

The side load driving portion 26 is capable of driving rods of various diameters. For example, the attachment 10 can be used to drive rods 13 of ½", ⅝", or ¾" diameters. In some embodiments, the attachment 10 can be used to drive rods 13 of ⅜" or 1" diameters. The slope of the frustoconical portions 42, 50 dictates the size of rods 13 that can be driven. More particularly, the collet 38 is movable within the aperture 42, against the force of the biasing member 62, to accommodate larger diameter rods. As the collet 38 moves towards the end cap 66, the aperture 42 widens and allows the bearings 58 to move radially outwards to accommodate a larger diameter rod 13, while being able to contact both the body 14 and the rod 13. The use of a conical spring as the biasing member 62 allows for a shorter overall attachment length (e.g., the washer end cap 66 rather than the cup), because the conical spring is compressible to a flatter shape than a cylindrical compression spring. In other words, the use of a cylindrical compression spring requires the cup-shaped end cap to provide clearance for the collet 38 to move within the aperture 42 and accommodate larger diameter rods 13.

Figure 6:
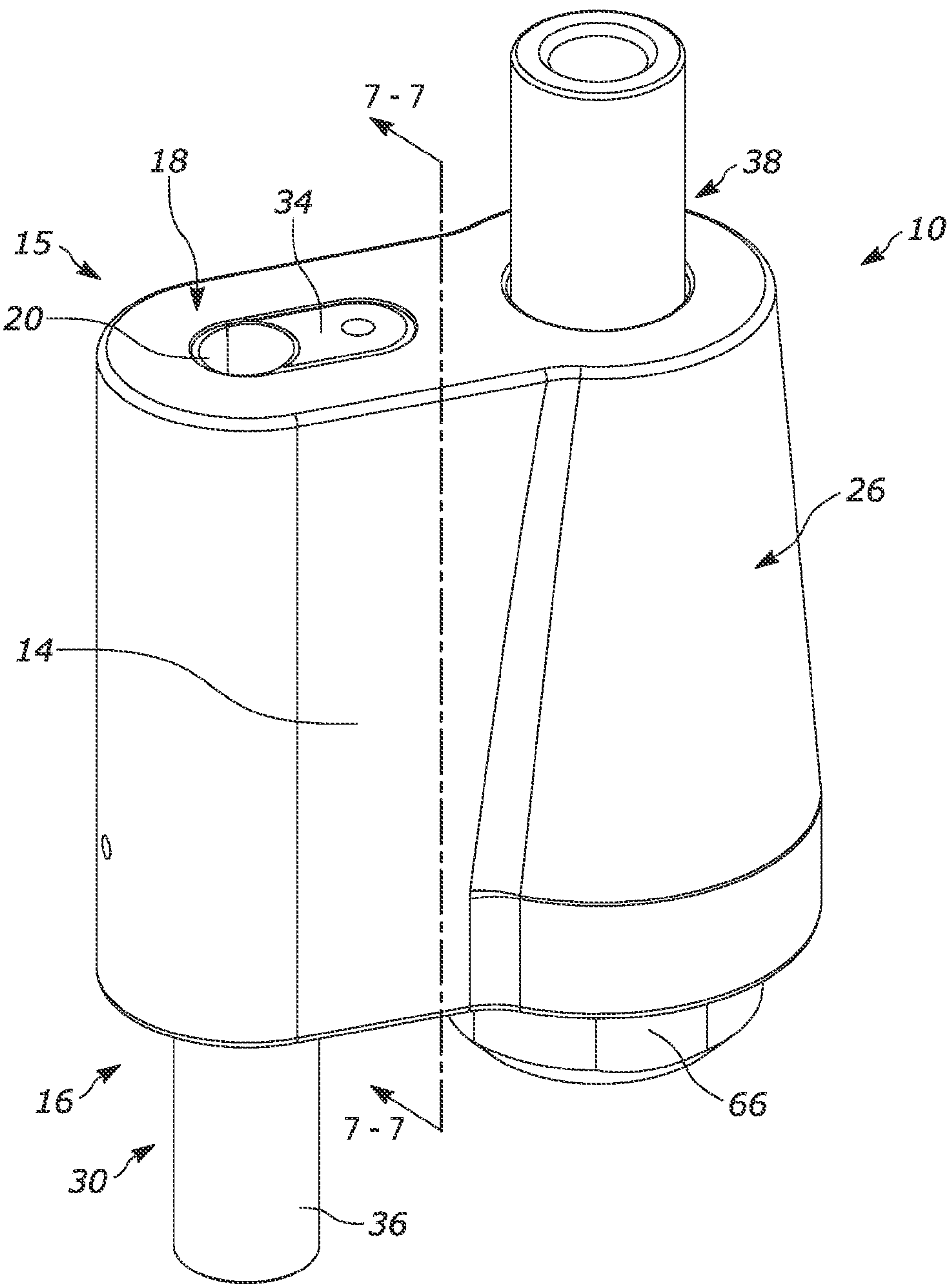
FIG. 6 is top perspective view of an attachment according to yet another embodiment of the present disclosure.
Figure 7:
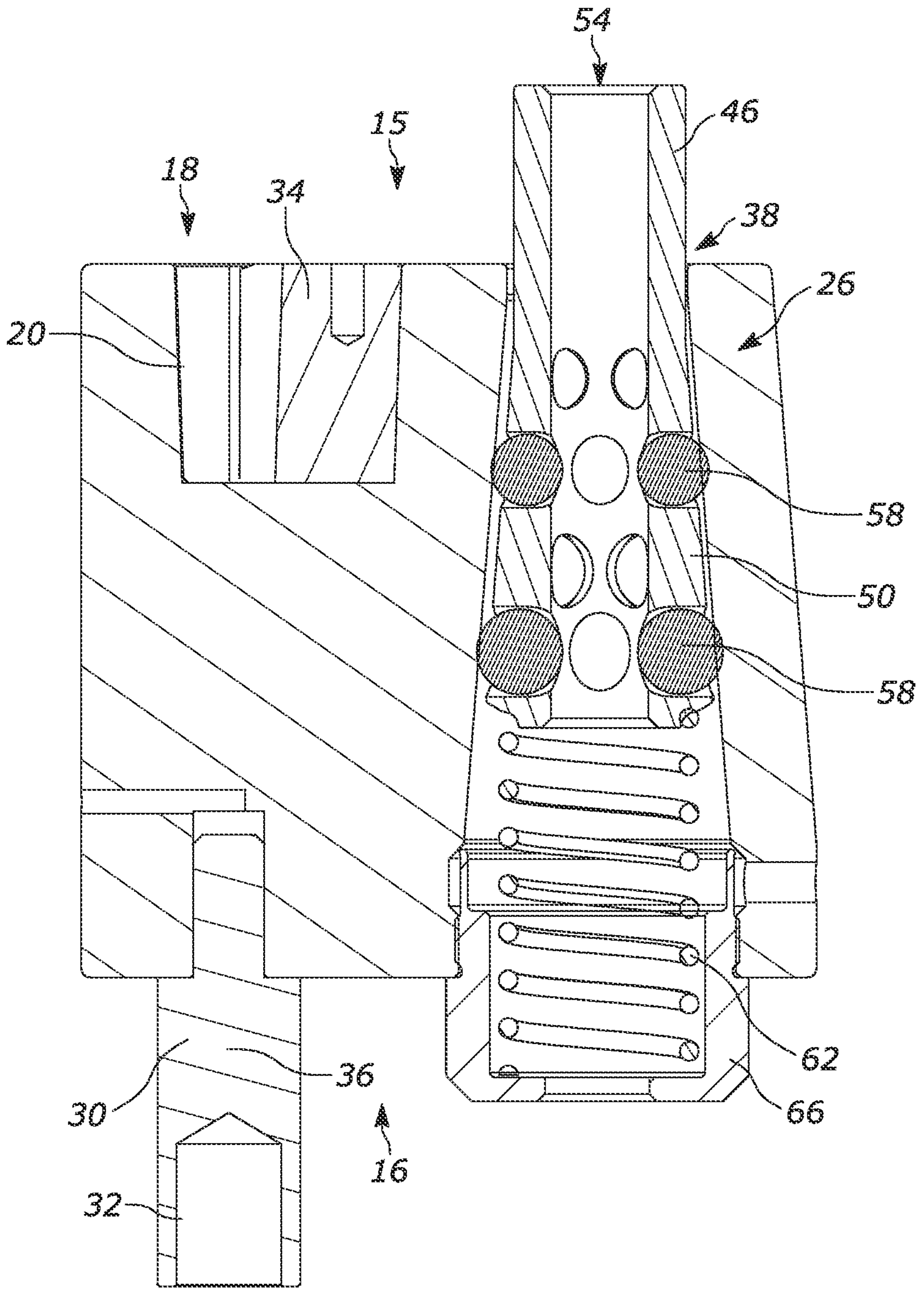
FIG. 7 is a cross-sectional view of the attachment of FIG. 6, taken along section line 7-7 in FIG. 6.

With reference to FIGS. 2 and 3, the top load driving portion 30 is illustrated as a blind bore 32 on a bottom side of the body 14 (e.g., the second end 16 of the body 14). A longitudinal axis A3 of the top load driving portion 30 is parallel to the side load driving axis A2 and to the impact axis A1. In some embodiments, the top load driving axis A3 is co-axial with the impact axis A1. Furthermore, in some embodiments, the top load driving portion 30 may be formed as a post 36 extending below the body 14 and having the blind bore 32 therein (FIGS. 6 and 7). In some embodiments, the impact axis A1 is not parallel to one or both of the side load driving axis A2 and the longitudinal axis A3 of the top load driving portion 30.

Figure 1A:
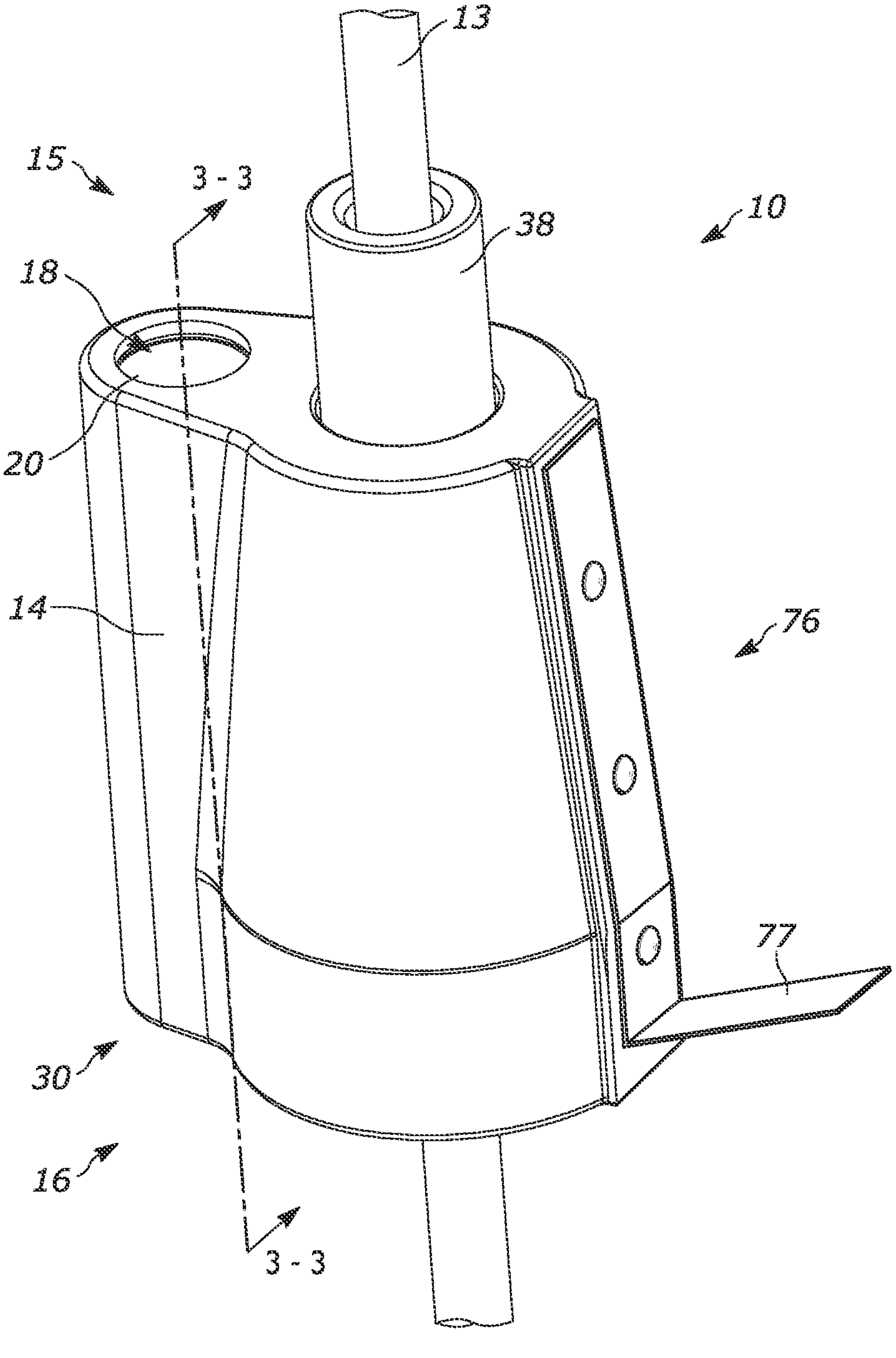
FIG. 1A is a top perspective view of the attachment of FIG. 1, illustrating an accessory coupled to the attachment.

With reference to FIG. 1, in some embodiments, the body 14 includes an accessory receiving portion 70. In the illustrated embodiment, the accessory receiving portion 70 includes a flat plate having fastener receiving holes 74. One such accessory is a step 76 that can be fastened to the attachment 10 via the fastener receiving holes 74 (FIG. 1A). The step 76 may include, for example, a bar 77 or strap extending from a side of the attachment 10. Another such accessory is a handle that can be fastened to the attachment 10 via the fastener receiving holes 74. In operation, the step 76 allows a user to apply a force to the attachment 10, and thus the rod 13, with their foot while driving the rod 13. This force can steady the rod 13 during driving and may also increase the efficiency of the driving by applying a downward force (e.g., in the same direction as the driving force). The step 76 may be foldable, removable, or otherwise configurable to move out of the way when not in use.

The attachment 10 of the present disclosure is optimized for efficient driving of the rod 13. The optimization is in part due to decreasing the overall mass of the attachment 10. Having less mass below the impact point of the powered hammer results in a greater driving force being transmitted to the rod 13. To accomplish this, the overall size of the body 14 is decreased, and the body 14 is formed of lightweight and strong materials such as aluminum or magnesium. For example, compared to a similar attachment made of steel, an attachment made of aluminum may weigh about 65% less, while an attachment made of magnesium may weight about 80% less. In the illustrated embodiment, the impact receiving portion 18 and the driving portion 22 of the body 14 are integrally formed as a single piece. In such embodiments, the impact receiving portion 18 and the driving portion 22 may be formed of the same material. In other embodiments, the impact receiving portion 18 and the driving portion 22 may be separate pieces that are secured (e.g., fastened, welded, etc.) together. In such embodiments, the impact receiving portion 18 and the driving portion 22 may be formed of the same material or may be formed of different materials from each other.

Figure 5:
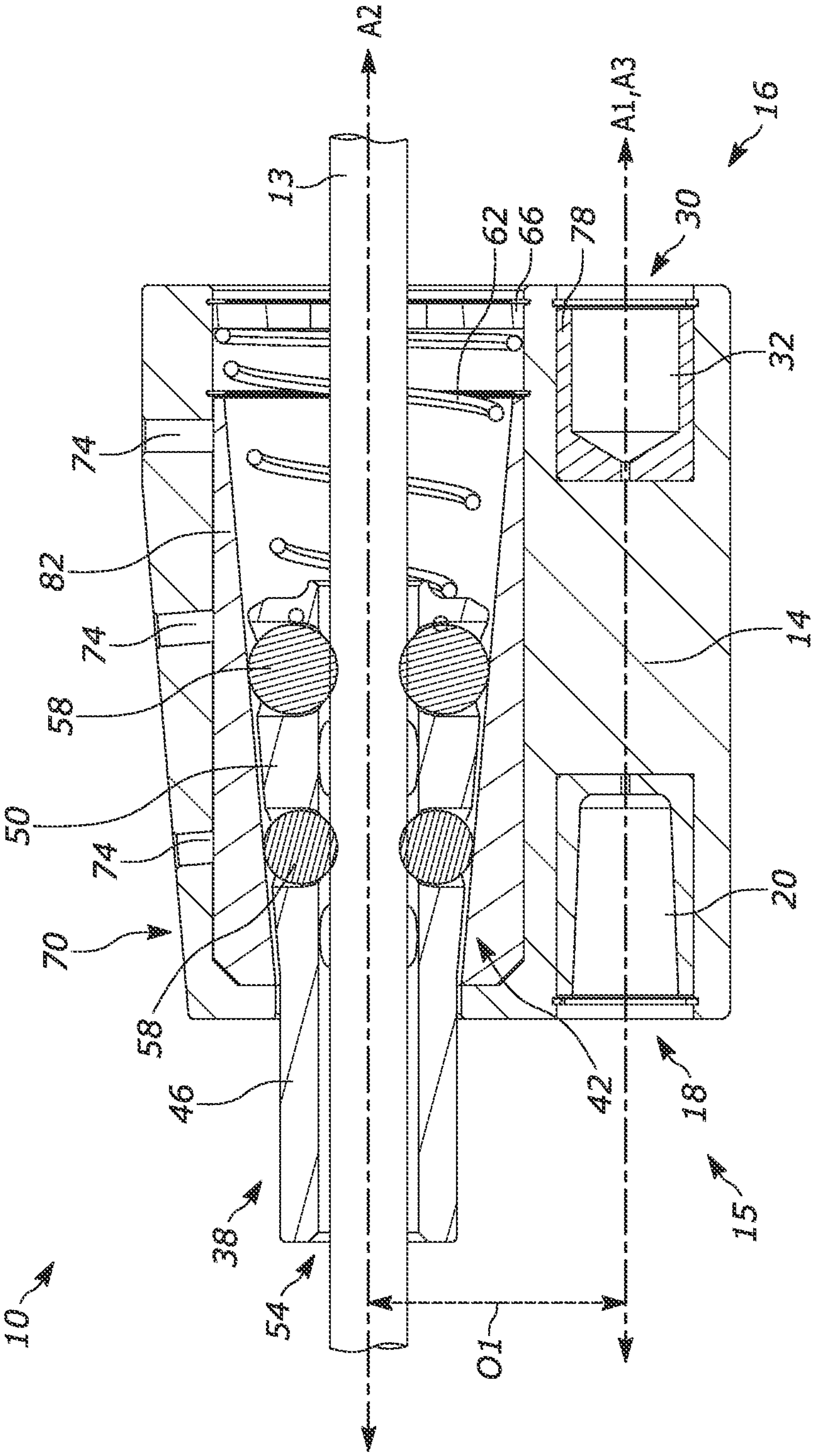
FIG. 5 is a cross-sectional view of an attachment according to another embodiment of the present disclosure.

Referring now to FIG. 5, in some embodiments, hardened steel is included to increase the strength of high wear areas of the body 14. For example, a hardened steel sleeve 78 may be applied to the top load driving portion 30 so that the bore 32 is not overly worn during operation. Similarly, the collet 38 and the end cap 66 can be formed of high strength steel, and a different steel sleeve 82 may be applied to the aperture 42 so that the bearings 58 do not mar the body 14 of the attachment 10 during use. Furthermore, the shape of the side load driving portion 26 increases rod driving efficiency by decreasing an offset distance O1 between the impact axis A1 and the side load driving axis A2. A shorter offset distance O1 between the impact axis A1 and the side load driving axis A2 decreases the bending moment arm applied to the rod during impacts and allows more of the force from the impact to be transferred to the rod 13 to drive the rod 13 linearly into the ground.

To drive a rod 13 with the above-described attachment 10, the operator first couples the attachment 10 to the powered hammer via the impact portion 18. In the illustrated embodiment, the driving shank is inserted into the chuck of the powered hammer. If the attachment 10 has not been used before (e.g., the driving shank is not secured within the impact portion 18), the operator also inserts the driving shank into the blind bore of the impact portion 18. Next, the rod 13 is inserted into the side load driving portion 26 from above the attachment 10. The insertion direction corresponds to the direction D1 in which the collet 38 allows for relative movement of the rod 13 and the attachment 10 (e.g., opposite the driving direction D2). At this point, the rod 13 can be aligned with the ground at a desired location and the operator can actuate the powered hammer to begin driving the rod 13. Optionally, the operator may have secured a step to the attachment 10 to assist in driving the rod 13. As the rod 13 is driven, the operator adjusts the position of the attachment 10 relative to the length of the rod 13 until the rod 13 is nearly driven into the ground. At this point, the operator will release the side load driving portion 26 from the rod 13 and insert a top of the rod 13 into the top load driving portion 30 to complete driving the rod 13 into the ground. While the steps of a driving operation have been described in a particular order above, one or ordinary skill in the art will understand the ability to perform the steps in a different order.

The attachment 10 has been described with respect to driving electrical ground rods 13. However, one of ordinary skill in the art will understand that the attachment 10 can be used for driving other rods and stakes as well.

Although the invention has been described in detail with reference to certain preferred embodiments, variations and modifications exist within the scope and spirit or one or more independent aspects of the invention as described.

Various features and advantages of the disclosure are set forth in the following claims.

What is claimed is:

1. An attachment configured for use with a powered hammer to drive a rod into the ground, the attachment comprising:

a body;

an impact portion defining an impact axis, the impact portion including a bore configured to receive a driving shank coupled to the powered hammer, the impact portion configured to receive repeated impacts from the powered hammer; and a driving portion in which the rod is receivable, the driving portion including a side load driving portion defining a side load driving axis that is parallel to the impact axis, the driving portion further including a top load driving portion defining a top load driving axis that is parallel to the side load driving axis, wherein the side load driving portion includes a one-way collet configured to transmit a driving force generated by the repeated impacts from the powered hammer to a side of the rod, the one-way collect movable within the side load driving portion and configured to allow the attachment to move relative to the rod in a first direction and to prevent relative movement between the attachment and the rod in a second direction, opposite the first direction, an end cap configured to secure the one-way collet within the side load driving portion, the end cap disposed entirely within a periphery of the body, and a biasing spring disposed between the one-way collet and the end cap, the biasing spring configured to apply a biasing force to the one-way collet.

2. The attachment of claim 1, wherein the top load driving axis is co-axial with the impact axis.

3. The attachment of claim 1, wherein the one-way collet includes a frustoconical portion, and wherein the body defines a frustoconical aperture in which the one-way collet is received.

4. The attachment of claim 3, wherein the one-way collet includes a plurality of bearings disposed about the frustoconical portion, the plurality of bearings configured to engage the rod.

5. The attachment of claim 4, wherein the one-way collet is moveable within the frustoconical aperture, and wherein movement of the one-way collet within the frustoconical aperture accommodates for rods of various diameters.

6. The attachment of claim 5, wherein the biasing spring is configured to bias the one-way collet toward a position corresponding to a minimum rod diameter.

7. An attachment configured for use with a powered hammer to drive a rod into the ground, the attachment comprising:

a body;

an impact portion defining an impact axis, the impact portion including a bore configured to receive a driving shank that is coupled to the powered hammer, the impact portion configured to receive repeated impacts from the powered hammer; and a side load driving portion in which the rod is receivable, the side load driving portion including a one-way collet having a plurality of bearings configured to engage the rod and transmit a driving force due to impacts from the powered hammer to the rod, wherein the one-way collet includes a frustoconical portion, and wherein the body defines a frustoconical aperture in which the one-way collet is disposed, wherein the plurality of bearings is oriented in a plurality of rows, each of the plurality of rows extending around a circumference of the frustoconical portion, and wherein each of the plurality of bearings within a row of the plurality of rows has the same nominal size, and wherein the plurality of bearings in adjacent rows of the plurality of rows have different nominal sizes.

8. The attachment of claim 7, wherein changes in sizes of the plurality of bearings of adjacent rows corresponds to a slope of the frustoconical portion such that each bearing is in contact with the rod when driving the rod.

9. The attachment of claim 7, further comprising a top load driving portion including a bore configured to receive an end of the rod therein to transmit the driving force to the rod.

10. The attachment of claim 9, wherein the top load driving portion defines a top load driving axis that is coaxial with the impact axis.

11. An attachment configured for use with a powered hammer to drive a rod into the ground, the attachment comprising:

a body having a first end and a second end opposite the first end;

an impact portion positioned on the first end of the body and configured to receive repeated impacts from the powered hammer, the impact portion including a bore configured to receive a driving shank coupled to the powered hammer;

a top load driving portion positioned on the second end of the body and configured to transmit the repeated impacts to a top of the rod; and a side load driving portion configured to transmit the repeated impacts to a side of the rod, the side load driving portion including:

a frustoconical collet disposed within an aperture in the body and configured to receive the rod, a biasing member configured to bias the frustoconical collet towards the first end of the body, and an end plate coupled to the body and configured to secure the biasing member and the collet within the body, wherein the biasing member is a conical compression spring.

12. The attachment of claim 11, wherein the top load driving portion defines a top load driving axis, wherein the side load driving portion defines a side load driving axis, and wherein the top load driving axis is parallel to the side load driving axis.

13. The attachment of claim 12, wherein the impact portion defines an impact axis that is parallel to the side load driving axis.

14. The attachment of claim 11, wherein the side load driving portion includes a plurality of bearings disposed about the frustoconical collet, the plurality of bearings configured to engage the rod.

15. The attachment of claim 14, wherein the plurality of bearings increase in size from a narrow portion of the frustoconical collet toward a wide portion of the frustoconical collet, such that each bearing is in contact with the rod when the rod is driven by the side load driving portion.

* * * * *